United States Patent
Morrissey

(10) Patent No.: US 8,811,593 B1
(45) Date of Patent: Aug. 19, 2014

(54) CALL CENTER AGENT CENTRIC SPEECH DECODING SYSTEM AND METHOD WITH QUALITY ASSURANCE FUNCTION

(71) Applicant: Applied Business Technologies, Delray Beach, FL (US)

(72) Inventor: Ryan Morrissey, Delray Beach, FL (US)

(73) Assignee: Applied Business Technologies, Delray Beach, FL (US)

( * ) Notice: Subject to any disclaimer, the term of this patent is extended or adjusted under 35 U.S.C. 154(b) by 0 days.

(21) Appl. No.: 14/018,010

(22) Filed: Sep. 4, 2013

(51) Int. Cl.
*H04M 3/00* (2006.01)
*H04M 5/00* (2006.01)

(52) U.S. Cl.
USPC .................................. 379/265.06; 379/265.01

(58) Field of Classification Search
USPC .......................................... 379/265.01, 265.06
See application file for complete search history.

(56) References Cited

U.S. PATENT DOCUMENTS

| | | | |
|---|---|---|---|
| 6,868,154 B1* | 3/2005 | Stuart et al. | 379/265.06 |
| 7,783,027 B2* | 8/2010 | Shinpuku et al. | 379/265.05 |
| 2005/0141693 A1* | 6/2005 | Stuart et al. | 379/265.06 |
| 2006/0140389 A1* | 6/2006 | Stuart et al. | 379/265.02 |

* cited by examiner

*Primary Examiner* — Oleg Asanbayev
(74) *Attorney, Agent, or Firm* — Robert C. Kain, Jr.

(57) ABSTRACT

The computerized call center method and system decodes agent and customer communications sessions. Questions and answers (Q&A) are displayed to the agent based upon decoding of agent speech using both a basic Q&A database and an agent database, each with key words/phrases. A positive feedback loop uses agent's speech data for the agent key word-phrase database. When words-phrases are decoded, the system queues up and displays Q&A in real time from the Q&A database (with speech data elements for word-phrases). A quality function for successful sessions integrates agent key words-phrases into the basic Q&A database.

8 Claims, 11 Drawing Sheets

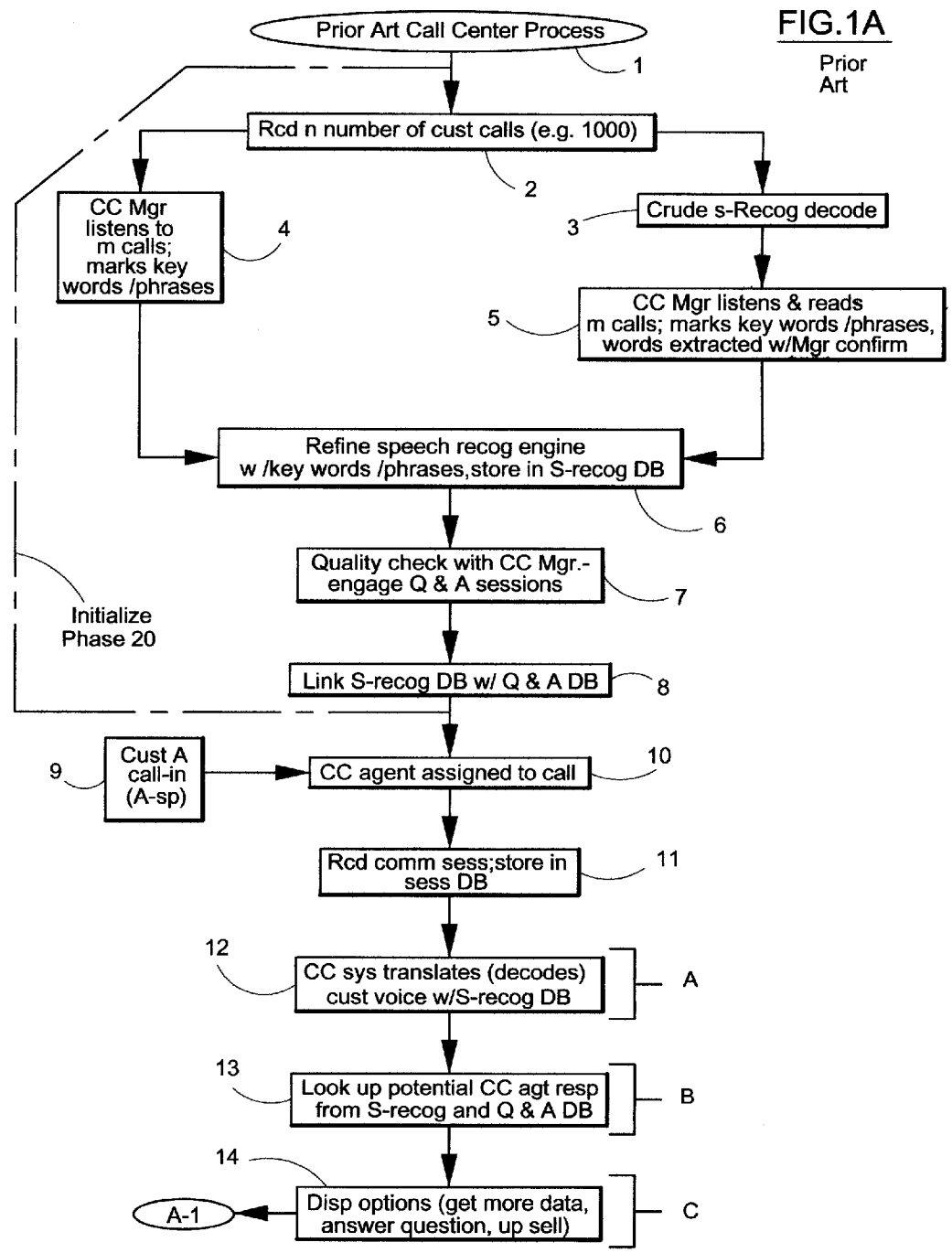

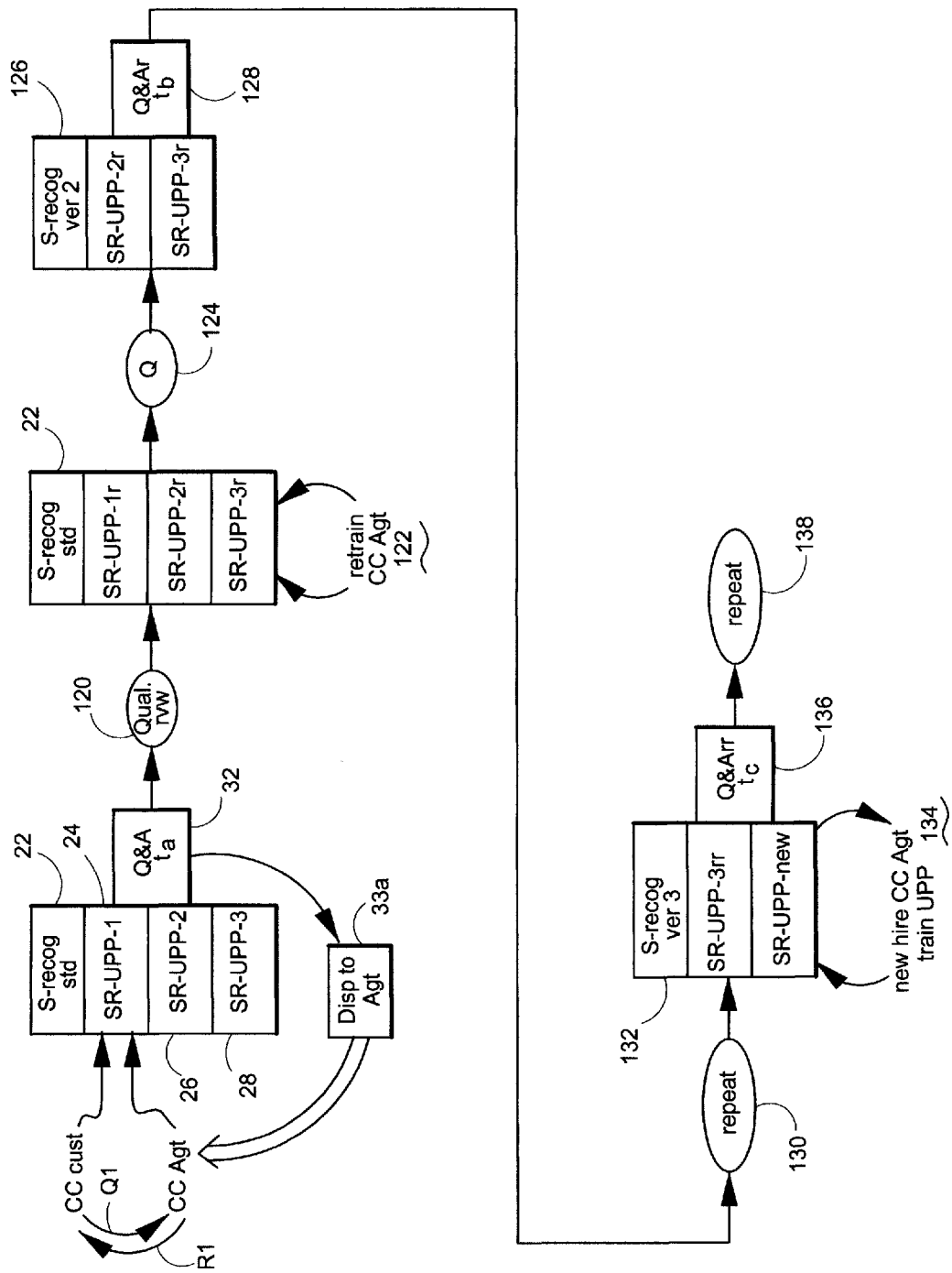

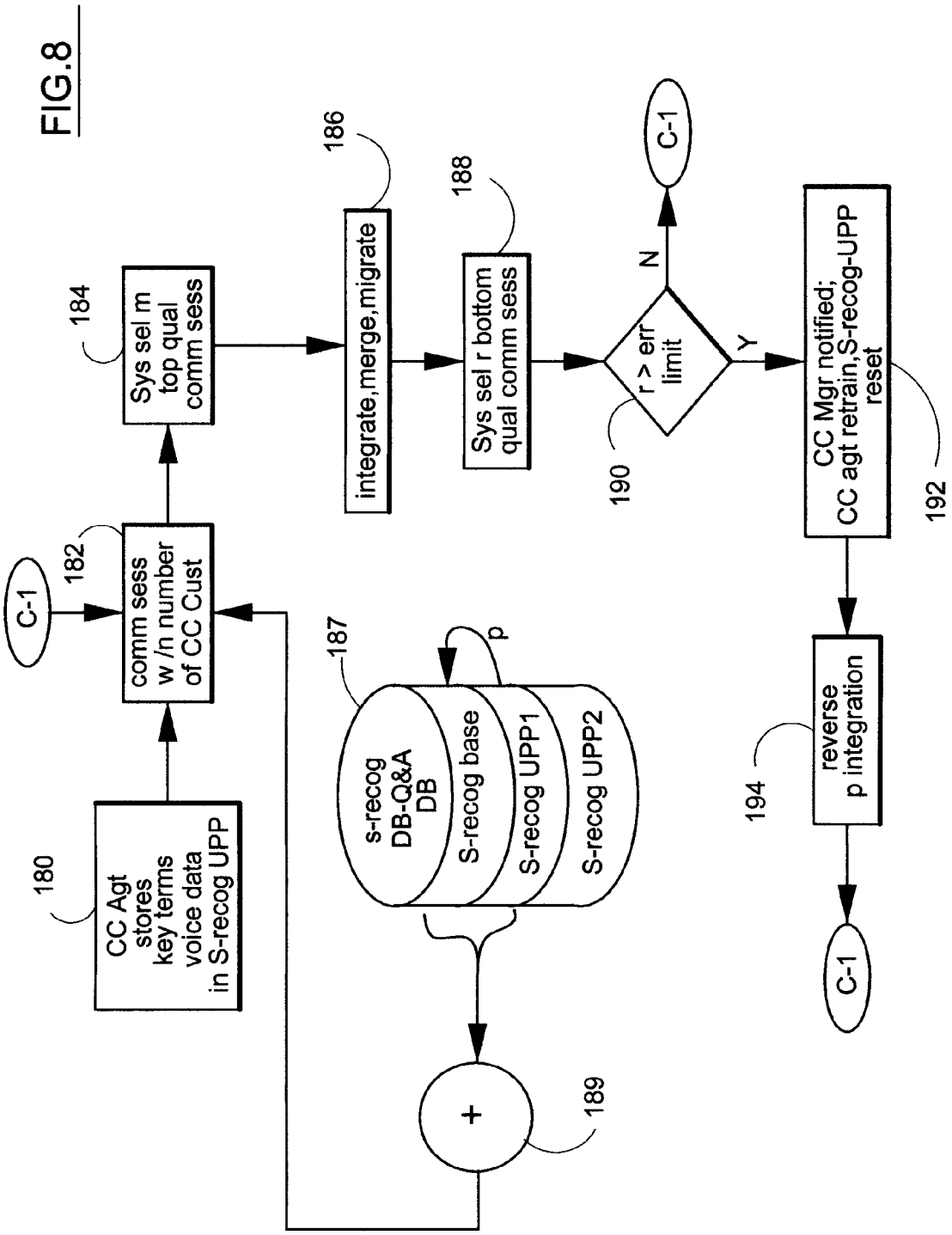

CALL CENTER AGENT CENTRIC SPEECH DECODING SYSTEM AND METHOD WITH QUALITY ASSURANCE FUNCTION

The present invention relates to a computerized method and a computer system for an agent-centric speech decoding system utilized by a call center.

BACKGROUND OF THE INVENTION

Call centers are utilized by businesses to interface with their customers. Some call centers direct sell or cold call customers to sell products or services. Other call centers provide customer information and transactional assistance such as for refunds, product use assistance, product improvements, billing matters, complaints, etc. As is known in the industry, the physical plant or facility for the call center may be distant from the physical location of the agent. The agent "in the call center" is electronically connected to the call center via a telecommunications network. The agent may work at home and be electronically coupled to the call center computer. Sometimes this network is the internet and at other times the network is the telephone telecommunications network. Herein, these communications networks are generally identified as a "telecommunications network" without regard to whether one or more networks are electronically and communicatively coupled together.

As is known in the prior art, the agent engages in a responsive agent-customer communicative event with the agent and the customer on a telephone or a smartphone or potentially on a computer wherein the agent and the customer are communicating over the telecommunications network that carries data between the calling parties, that is digital data and, more importantly, digital voice data. The digital voice data is channeled or passed through the call center computer at the call center facility. Further it is known that these agent-customer communicative events are recorded for quality insurance and training purposes.

Further details of prior art systems are discussed in FIGS. 1A, 1B, 2A and 2B.

OBJECTS OF THE INVENTION

It is an object of the present invention to provide a computerized method and a computer-based system for decoding speech between an agent and a customer as the digital voice data passes through a call center via a telecommunications network.

It is another object of the present invention to provide a method and a system wherein the speech decoder in the call center has a agent-centric database in addition to a basic Q&A database with speech recognition data.

It is a further object of the present invention to provide a method and a system wherein a basic question and answer (Q&A) database includes basic keywords and basic keywords phrases, associated speech recognition data and an agent keyword and phrase database having agent voice and speech data is used concurrently with the basic Q&A database and speech recognition data therein.

It is another object of the present invention to provide initial training set of keywords and phrases or an initial group of questions and responsive answers which are read by the agent and captured by the method and system to build the agent's keyword and phrase database.

It is a further object of the present invention to use classifications for agent-customer communication sessions consisting of a non-specific event, a sales event or a customer satisfaction event and to monitor the sales events and customer satisfaction events and then to integrate the agent keyword and phrase data into the basic Q&A database upon detecting those successful responsive agent-customer communications events.

SUMMARY OF THE INVENTION

The computerized method and system decodes speech exchanged between an agent virtually at a call center and a customer during a responsive agent-customer communicative event. Since the call center program displays to the agent questions and answers commensurate with the questions asked by the customer, and the responses by the agent, the system and method has a positive feedback loop using an agent's key word and key phrase database, with speech recognition elements unique to the agent for the agent's key words and phrases. In other words, the method and system detects when the call center agent uses the agent's key words and phrases and then queues up and displays the associated question and answer (from the Q&A database). The displayed Q&A informs the agent how to respond to the customer's inquiry. The method and system is first initialized with a basic Q&A database having basic Q&A data therein and basic key words and phrases and speech data elements for those words and phrases. The agent's key word and key phrase database is built by recording the agent's speech for these words and phrases. Therefore, the method and system, in decoding agent's speech, uses both the basic Q&A database and the agent's key word/phrase database.

A quality function is also employed which first categorizes the agent-customer communication event as either a non-specific event, a sales event or a customer satisfaction event. The communication sessions representing sales events and customer satisfaction events are tallied or summed until the number exceeds a predetermined value. Thereafter for these successful agent-customer sessions, the agent's key words and phrases, used in these successful communication events are integrated or merged into the basic Q&A database and, more precisely, into the speech recognition potion of the main Q&A database.

The system includes a call center computer having a speech decoder operatively coupled to a data processor and a memory store. The basic Q&A database and the agent's key word and phrase database is stored in the memory store. the system has a display module which causes a display of data, such as relevant Q&Q data, to the agent during a communication sessions. A recorder captures the agent's response to displayed initial training set as agent key speech data and this forms the basis for the agent's key word and phrase database. The system also includes a session recorder for the agent-customer event. The speech decoder decodes real time agent speech during the communicative event by recognizing a match between the real time agent speech data and either (a) the speech recognition data in the Q&A database (the basic key words and phrases), or (b) the agent's key word and phrase in the agent database. Since unique combinations of key words and phrases are associated with certain Q&A, the system is configured to display the Q&A to the agent. The system has a retrieval module to obtain from the Q&A database the associated corresponding questions and answers. The system's display module causes a display of the retrieved questions and answers to the agent in real time.

BRIEF DESCRIPTION OF THE DRAWINGS

Further objects and advantages of the present invention can be found in the detailed description of the preferred embodiments when taken in conjunction with the accompanying drawings in which:

FIGS. 1A and 1B diagrammatically illustrate a prior art call center process;

FIG. 6 diagrammatically illustrates the agent-centric speech decoding system with a quality review that integrates the agent keyword and phrase database into the basic speech recognition database based upon quality control factors;

FIG. 8 diagrammatically illustrates the positive or forward feedback system for integrating the agent keyword and phrase database (sometimes referred to herein as the agent UPP or agent user personal profile) into the basic Q&A database.

DETAILED DESCRIPTION OF THE PREFERRED EMBODIMENTS

Figure 1B:
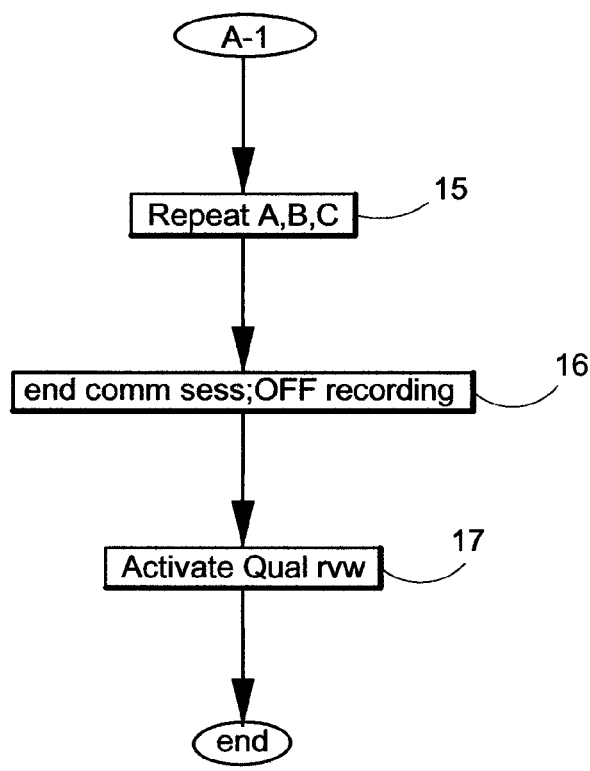

The present invention relates to a call center agent-centric speech decoding system and method with a quality assurance function. Similar numbers designate similar items throughout the drawings.

FIGS. 1A, 1B, 2A and 2B diagrammatically illustrate prior art systems and functions. Further descriptions and illustrations of the present invention are found in FIGS. 3-8. Sometimes in the drawings and in the specification abbreviations are used. Some of these abbreviations are found in the Abbreviations Table at the end of this specification.

FIG. 1A diagrammatically illustrates a prior art call center process. The process in FIG. 1A is carried forward in FIG. 1B per jump point A-1. The prior art process is initialized in step 1 and in step 2 as the system records n number of agent-customer calls such as 1,000 calls. After the prior system records a predetermined number n of customer calls, the system either branches to function block 4 or function block 3. In function block 4, the call center manager (CC mgr) listens to a smaller number of calls, in calls out of the n recorded calls in step 2, and identifies or marks keywords or phrases in those m calls. In step 3, the system engages in a crude speech recognition decoding step using third party speech data banks. These data banks are available from GOOGLE™, MICROSOFT™. See, for example, GOOG 411™ which was generally available in 2007. Also, U.S. Pat. No. 7,587,322 discusses a speech recognition data bank. These or other speech recognition data banks could be utilized in prior art function 3.

After the crude recognition or decoding of the digital voice data from the responsive agent-customer communications event is captured in step 2, the prior art system in step 5 activates a "listen and read" step by call center manager. The call center manager reviews in number of calls and marks the keywords and key phrases. These keywords and key phrases are extracted and more importantly the speech recognition for the keywords and phrases is extracted and placed in a database with a digital confirmation noted by the manager.

In prior art step 6, the system refines the speech recognition engine with the keywords and phrases and stores them in the speech recognition database.

Although a "database" is referred to throughout this specification, any type of organized data structure, a spreadsheet or other relational data structure with indexes and lists, are meant to be generally referred to herein as a "database." Therefore the term "database" is broadly meant to cover any organized data structure. If two databases are referred to, it should be noted that a single database may be used, just with different relational fields and records to distinctly call up the requisite dat elements as described in this specification. The meaning of database applies equally to the prior art description and to the description of the invention.

In step 7, a quality check engages the CC or call center manager. The quality check involves a review of the question and answer sessions and the keywords and phrases. In step 8, the speech recognition database is used to review the agent-customer recorded speech communication session and keywords and phrases are detected in that recorded speech communication. The key words/phrases are linked to unique Q&A couplets in the Q&A database. In other words, a single question and answer Q&A is associated with a unique combination of one or more keyword or phrases such that if the computer system locates the correct combination or combination of keywords or phrases, a single question and answer couplet will be retrieved from Q&A database. Each couplet is triggered based upon a unique combination of certain keywords and phrases. In this manner, the prior art system has an initialization phase 20.

In prior art step 10, the call center agent is assigned to a call based upon customer A calling in at step 9. Step 9 may also be the call center calling out to the customer. Customer A engages in A: Sp or customer speech and the resulting digital voice data is recorded in the record ON session in step 11. The recorded communications session is recorded in the comm session database. In prior art step 12, the call center system translates or decodes the customer voice with speech recognition database. Also, the call center decodes the agent voice with the speech recognition database. Typically, this happens in real time. In step 13, the system identifies a certain response from the agent (a keyword/phrase) from the speech recognition data elements in the designated database. In other words, the agent and the customer will engage in a conversation and the system monitors the words of both. When those words, after converted into digital data, are translated or decoded, those words are compared against the basic question and answer keyword and phrase database. If a certain combination of keywords and phrases are located in a communications segment, the system identifies the unique question and answer couplet and displays the question and answer to the call center agent. In step 14, a display is effected to the agent indicating a further response to the customer. In this manner, the agent is requested to obtain more information or data from the customer, the agent is prompted to answer a question in a certain manner, or to sell products or services. Of course, rather than the customer A calling into the call center, the call center may call out and then assign an agent (noted in step 10) to a particular customer call.

In prior art FIG. 1B, in step 15, the system repeats steps A, B and C discussed earlier in FIG. 1A. In step 16, the communications session ends and the recording is turned OFF. In step 17, the system activates a quality review.

Figure 2A:
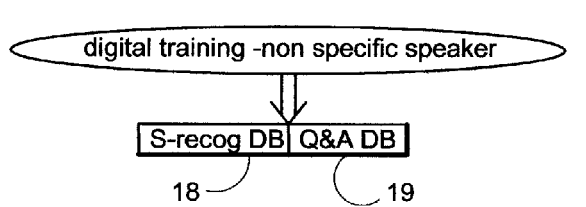
FIG. 2A diagrammatically illustrates a prior art digital training system with a non-specific speaker database.

With respect to prior art FIG. 2A, the speech recognition database, linked to the Q&A database, is trained using a non specific speaker. In other words, there is a speech recognition database that monitors the voice data transcribed during the responsive agent-customer communications session. When a certain keyword is located or key phrase is located, then the system looks to Q&A database 19 for the matching Q&A couplet. The speech recognition database 18 may be separate from Q&A database 19 or they may be integrated together.

In this specification, although separate databases may be identified and discussed, in reality a single database having multiple different fields, indexes, columns and rows and relationships can be established. Persons skilled in the art can develop efficient database operations in this manner.

Figure 2B:
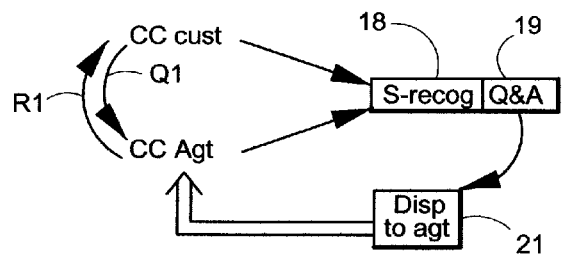
FIG. 2B diagrammatically illustrates a customary agent-customer sessions as a prior art system.

Prior art FIG. 2B shows that a call center customer asks a question Q1 of call center agent. The call center agent has a response R1 to the customer. An agent may repeat the question in order to have the call center computer pull up and display the appropriate Q&A couplet. Both the voice data from the customer and the agent are applied to the speech recognition engine and database 18. In the Q&A database 19, an output is generated which is a displayed Q&A to the agent as noted by display module 21. The double line to the CC agent in FIG. 2B indicates that the agent sees the responsive Q&A couplet as triggered by the unique combination of key word or phrases.

Figure 3:
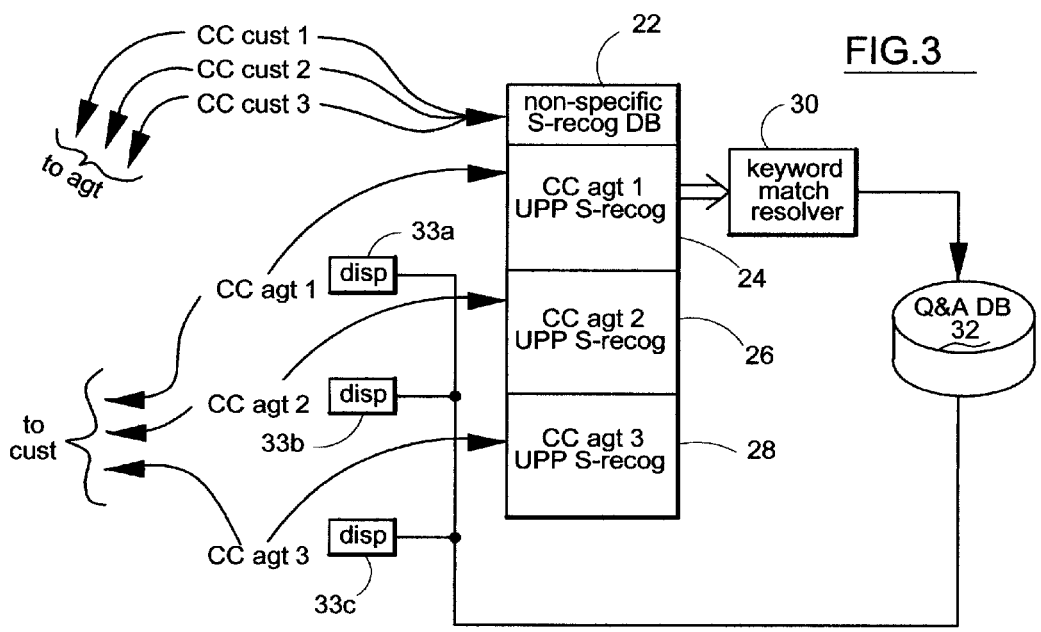
FIG. 3 diagrammatically illustrates the agent-centric speech decoding system and method in accordance with the principles of the present invention.

FIG. 3 diagrammatically shows some major system modules of the present invention. One of the several primary differences between the prior art and the present invention is that database 22 includes non specific speech recognition data or database as well as a call center CC agent 1 UPP speech recognition database. The CC agent UPP database is sometimes referred to herein as the agent's keyword and phrase database. Therefore, the agent would have a user personal profile (UPP) and that user personal profile would have an agent keyword phrase database 24 associated therewith. When the agent signs into the call center computer, and enters his or her password, the call center computer activates the agent keyword/phrase database or CC agent UPP. Agent 2 has his or her own keyword and phrase database 26. Agent 3 has a UPP keyword and phrase database 28. Customers 1, 2 and 3 call in or are subject to a communications event with the call center engaging agents 1, 2 and 3.

The speech recognition engine taps the databases as those conversations between customer 1 and agent 1, customer 2 and agent 2 and customer 3 and agent 3 are monitored by the speech recognition engine. The respective databases are used by the speech recognition engine. This engine uses both for the non specific speech recognition database as well as the respective agent unique keyword and phrase database 24, 26 and 28. Function block 30 determines a match between stored keywords/phrases and the real time agent-customer speech is detected by the speech recognition engine. If there is a dispute or a conflict between the non specific or basic speech recognition data 22 and agent keyword database 24, a keyword match resolver 30 selects the non specific data as a default. Other defaults could be set such as a display to the agent of "Please repeat the question" or "ask the customer x, y z." When the recognition engine ids the unique keywords and phrases for a particular Q&A couplet, the couplet is pulled from the Q&A database and a display is effected on the agent display 33A, 33B and 33C which shows the Q&A.

As used herein, the "display of Q&A" also includes the concept that only a single responsive display is presented to the agent rather than an entire question and an entire answer. The point of the invention is to prompt the agent to give an appropriate response to the customer.

Figure 4:
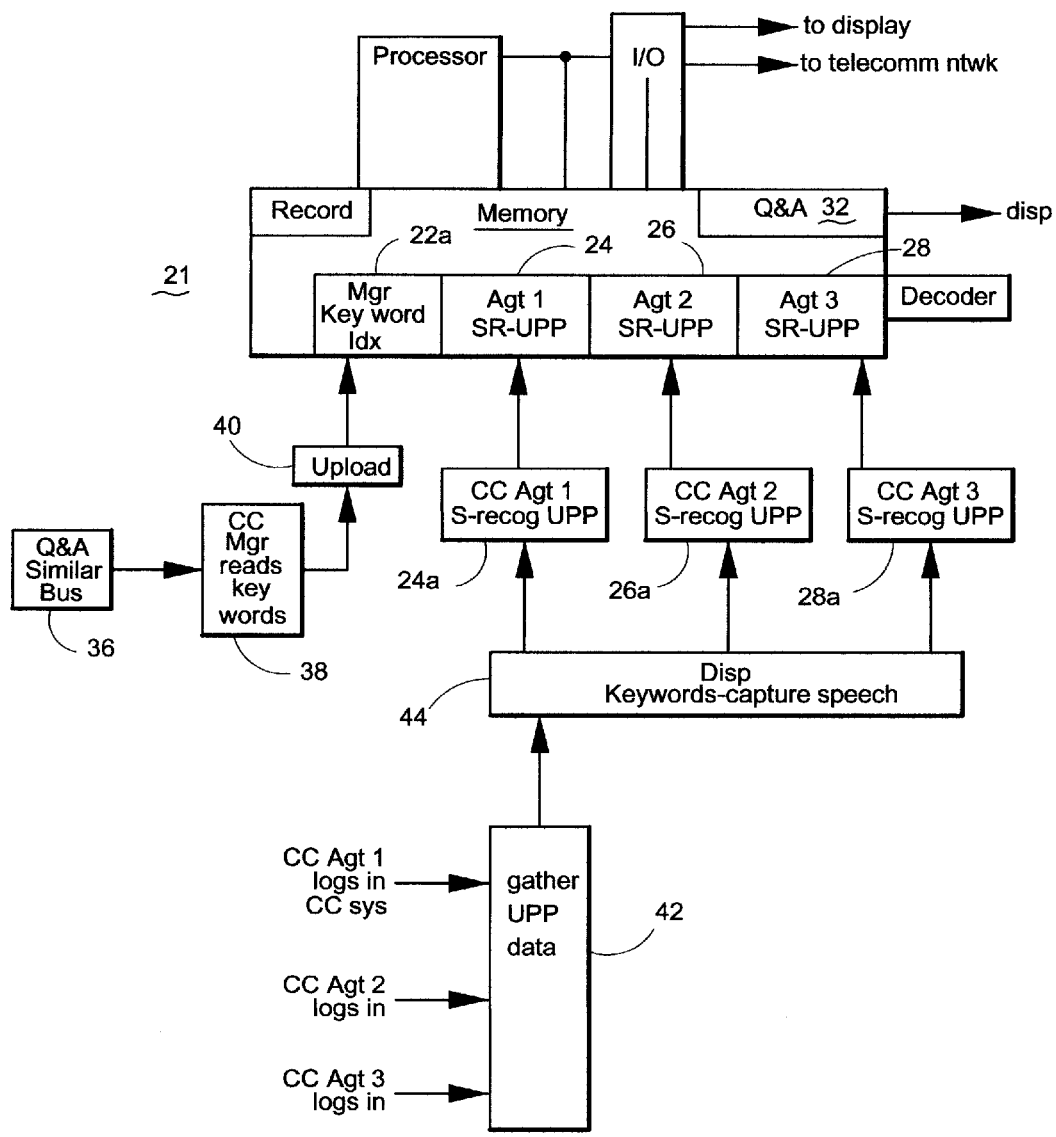
FIG. 4 diagrammatically illustrates process modules or subsystems for the agent-centric speech decoding system and method.

FIG. 4 shows a slightly different module and diagrammatic representation of the present invention. Another benefit of the present invention is to greatly reduce the set-up time for the call center operation. The initialization and set up of the call center database takes a large number of call data (see FIG. 1A) and has expert consultants decode and identify the keywords/phrases and write up responsive Q&A. This is very expensive. In the present inventive system, in FIG. 4, the business owner starts with basic text and builds a small basic Q&A database. In block 36, the manager of the call center identifies certain questions and answers from a similar business or an identical business. In step 38, the manager reads the keywords and phrases from the earlier obtained questions and answers. Step 40 uploads this data into a manager keyword index 22a. Upload function 40 provides this storage.

At a later time, different agents 1, 2 and 3 log into the call center system. In function module 42, the call center system has the agent complete a user personal profile (UPP) for the agent. In step 44, the system displays keywords and phrases to the agent. These keywords and phrases are then spoken by the agents 1, 2, 3 and the system captures the respective agent response to the displayed initial training set in the agent keyword/phrase database or, as illustrated, the agent UPP database. The initial training set could be an initial plurality of questions and responsive answers or an initial plurality of basic keywords and phrases. These basic keywords and phrases are have been previously associated with corresponding questions and responsive answers. As for reading the questions and responsive answers by the agent, it is reasonable that basic speech recognition tools could be utilized to identify the unique keywords and phrases from the spoken agent's voice data. This is an initial negative feedback word input loop. If the agent's speech data elements do not match the basic speech recognition data elements, the agent is requested to repeat the keyword/phrase or Q&A.

In steps 24a, 26a and 28a, the system for each agent 1, 2, 3, decodes and recognizes the initial training set by the agent. This decoded speech is stored in the larger database segments unique to the respective agent. Therefore, the agent keyword and phrase database is associated with the agent, as illustrated by the agent UPP-DB. Therefore, the agent keyword and phrase database for agent 1 is database segment 24, for agent 2 database segment 26 and for agent 3 database segment 28. The output from the speech recognition engine triggers the display output from the Q&A couplet 32 which is displayed to the agent. In this manner the agent's speech trains part of the recognition engine and database. Also the agent is trained to interact with the Q&A database.

FIG. 4 also shows that the memory includes the aforementioned database segments. The manager keyword index may be used to quickly access the basic speech recognition database 32. The system uses a processor coupled to an input/output module which is ultimately coupled to he agent's display device and to the telecomm network. The system includes a records and a decoder to engage the processes discussed herein. Persons of ordinary skill in the art know how to integrate the computer system to carry out the functional steps and modules discussed herein. FIG. 4 is a diagrammatic flow process and system module diagram.

Figure 5A:
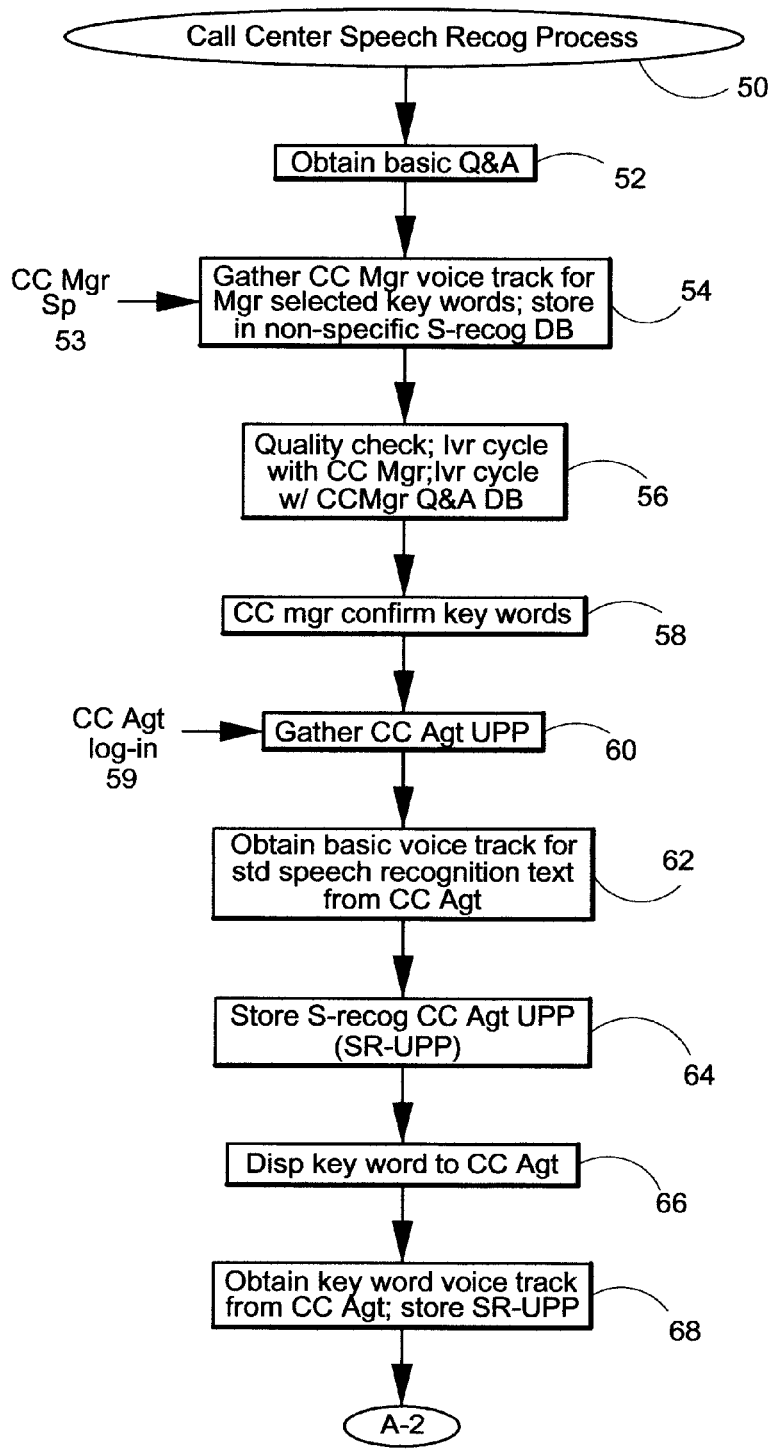
FIGS. 5A, 5B and 5C diagrammatically illustrate the call center speech recognition process in accordance with the principles of the present invention.
Figure 5B:
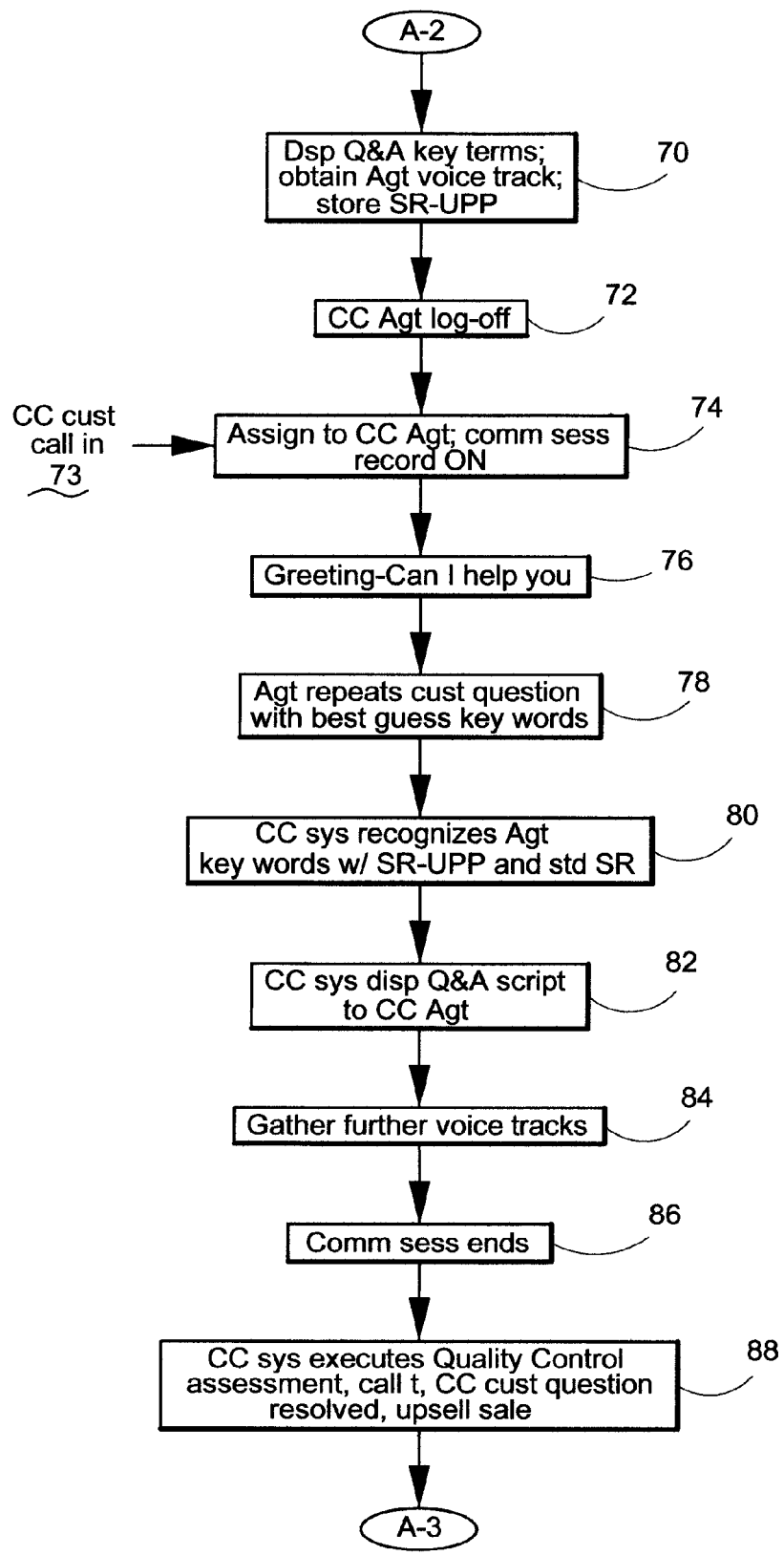
Figure 5C:
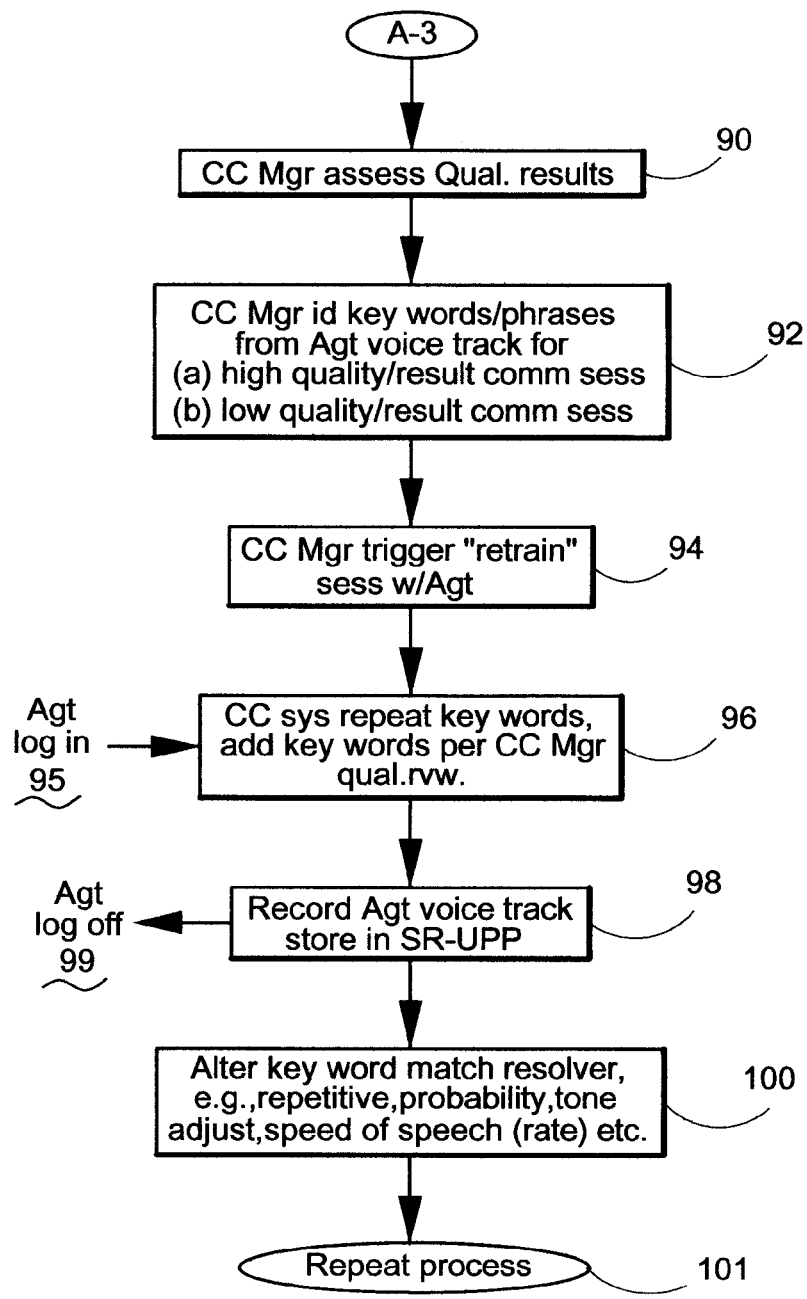

FIGS. 5A, 5B and 5C diagrammatically illustrate call center speech recognition process 50. In step 52, the system obtains basic question and answer or Q&A data. In step 54, the manager engages in speech 53 and the call center to computer gathers the manager's voice track for the manager selected keyword and phrases. As used herein, the term "keyword" refers to both single words as well as multiple words or phrases. The call center stores, in step 54, the manager's voice data in the non specific speech recognition database. Rather than use a manager's voice track, the method and system may purchase a third party non-specific or basic speech recognition database and speech decoding engine.

In step 56, a quality check is engaged. This quality check may include an interactive voice response (IVR) cycle with the manager. This IVR cycle would read back the stored Q&A couplet or may read back the selected keywords and key phrases to the manager. If an error is found, the manager could restate the keywords and key phrases to match the appropriate Q&A couplet. The system engages in an interactive IVR cycle with the manager and completes the basic Q&A database. In step 58, the manager confirms the keywords and phrases.

In step 60, the call center system gathers a particular agent user personal profile or UPP data. This involves the call center agent having a log in session 59 with the call center. Step 62 involves obtaining basic voice track data from the agent for the standard speech recognition text. In other words, it is common to have a standard "text" which the agent reads in order to obtain a basic voice track for the words spoken by the agent. In step 64, the system stores the recognized speech at the agent UPP which is better identified in this specification as the agent's keyword and phrase database. The agent's keyword database is built by obtaining, recording and decoding the agent's key speech data obtained in step 62.

In step 66, the system displays the keywords to the agent. In step 68, the system captures the voice track when the agent identifies and speaks the keywords or key phrases. These keywords are stored in the agent's keyword or key phrase database generally identified in the drawings as SR-UPP (speech recognition UPP (the agent's keyword database)).

FIG. 5A jumps to FIG. 5B at jump point A-2. In step 70, the system displays the Q&A key terms and further obtains the agent's voice track and stores the same in the agent's keyword database. In step 72, the agent logs OFF the call center system. This input feedback cycle confirms the agent's speech to certain keywords.

In step 74, the agent engages with a customer in a responsive agent-customer communicative event. Although FIG. 5B identifies the call center customer as calling in 73, the call center could also call out to a particular customer and then assign an agent to that communications session. Step 74 recognizes that the call center turns the monitoring or session recorder ON. In step 76, the call center displays to the agent a greeting which should be announced to the customer (can I help you?). In step 78 during the comm session, the agent repeats the customer question and provides his or her best guess to the customer inquiry in an attempt to use the keywords that the agent trained with earlier. In step 80, the system recognizes the agent keywords and phrases based upon the agent keyword and phrase database. In step 82, the system decodes in real time the agent speech by recognizing a match between the real time speech elements and either the basic keyword and phrases in the basic Q&A database or the agent keyword and phrase database in the SR-upp. In step 84, the system gathers and records additional voice tracks during the comm session. In step 86, the agent-customer communication session ends.

In step 88, the system executes a quality control assessment. This assessment includes a length of the call, an indication of "customer question resolved" or customer satisfaction, or the agent's sale of goods or services or the agent's upsell to the customer of additional goods or services. In other words, step 88 involves a determination whether the communications session between the agent and customer resulted in a (1) non-specific event or (2) a sales event or (3) a customer satisfaction event. In order to detect a sales event or a customer satisfaction event, the call center could search for keywords such as agree, sale, satisfy, acceptable, or other keywords. A sales event would involve a money transaction module that triggers a "sales event" indicator in the database. Otherwise, the speech recognition process described herein can be applied to the comm session recording to identify the customer satisfaction event. In this manner, the system can automatically determine, within some reasonable specificity, a non-specific event, a sales event or a customer satisfaction event. The system then jumps at jump point A-3.

In FIG. 5C, the manager assesses quality results of a number of comm sessions in step 90. In step 92, the manager identifies certain keywords and phrases from the agent's voice track, that is, the agent's keyword and phrase database which resulted in either a high quality result communications session or a low quality result communications session. In step 94, the manager can retrain the agent in order to reduce the number of low quality results. Otherwise, the manager can indicate that the agent keyword and phrases in the database which resulted in a high quality communications session be integrated into the basic Q&A speech recognition database.

In step 96, the agent as logged in as noted in step 95. The system repeats the keywords and permits the agent to add additional keywords or to rewrite (re-store) the keywords. The manager may require that the agent retrain the agent keyword database or improve his or her diction such that it matches closer the basic Q&A database speech recognition data. In any event, in step 98, the system records the agent's voice track and stores the same in the agent keyword database SR-upp. The agent logs off in step 99.

In step 100, the system alters the keyword match resolver (discussed above in connection with FIG. 3) regarding the repetitive nature of keyword, the probability that a certain combination of keywords and phrases results in a certain Q&A couplet, adjusts the spatial or speech rate of the agent as well as the speech data elements in the speech recognition software. In step 101, the system repeats.

In FIG. 6, the quality assurance function is integrated into the system such that the agent keyword and phrase database voice track (speech recognition elements) and voice data elements are integrated into the basic Q&A speech recognition data upon high quality indicators. Therefore, a customer and an agent engages in a communications event with questions Q1 and response R1. The voice tracks are decoded utilizing basic recognition data from the basic Q&A database 22 and, for agent 1, the agent keyword and phrase database 24 SR-UPP-1. In module 32, the Q&A database at time t-a displays to an agent via display module 33 the Q&A question and response couplet such that the agent can discuss the question and the response with customer. After that unique communications event between the customer and the agent, the system executes quality review 120. The quality review is discussed earlier to ascertain a non-specific comm event, a sales event or a customer satisfaction event. The Q&A module 32 includes a communications event monitor to ascertain those particular comm events. As a result of that quality review, the agent's keyword and phrase database is revised for agents 1, 2, 3 and their respective agent keyword database segments SR-UPP-1r, SR-UPP-2r, and SR-UPP-3r ("r" referring to revised). This may involve retraining the agent as noted at function 122.

The system ad process again undergoes a quality review 124 with subsequent communications event monitors for communications between customer and agent with Q1 and R1 question and response. In the following block 126, the speech recognition and the basic Q&A speech recognition engine and database has been revised to version 2 (S-Recog ver2) as noted in Q&A database 126. The first agent keyword and database (SR-UPP-1r, memory unit 222 between Q review 120 and 124) has been integrated into the basic Q&A speech recognition database 126. This is a positive feedback loop. Positive Q results in modules 120, 124 result in expansion of S-Recog Ver2, the basic Q&A database. Some may identify the revised Q&A speech recognition database as an enhanced Q&A database, that is enhanced by agent 1' keyword/phrases resulting from positive Q events.

In Q&A DB 126, only the agent 2 and agent 3 keyword databases are identified SR-UPP-2r, SR-UPP-3r. Of course, non-quality of low Q keywords in agent 1's database segment may be maintained in the agent 1's database (SR-UPP-2r) not shown in FIG. 6. The diagram shows full integration only as an example of the integration or merger of the two database segments. The questions and answers may be revised as noted by Q&Ar ("r" for revised) at time t-b in function module 128.

Function module 130 notes the system and process method repeats. In speech recognition database 132, a third version of the basic Q&A database (Ver-3) is noted but agent 3, agent keyword database SR-UPP-3rr has been further revised ("rr") but not integrated into the basic Q&A speech recognition data 132. A new agent has been hired as noted by training session 134 for the new agent and new agent UPP 134 (with an agent speech recognition data). Therefore, a new agent keyword and database is noted in FIG. 6 as SR-UPP-new. In step 136 at time t-c, the basic Q&A database has been revised twice Q&Arr and this is further noted by DB Ver2 and Ver 3 at memory modules 126, 132. In step 138, the system repeats.

Figure 7A:
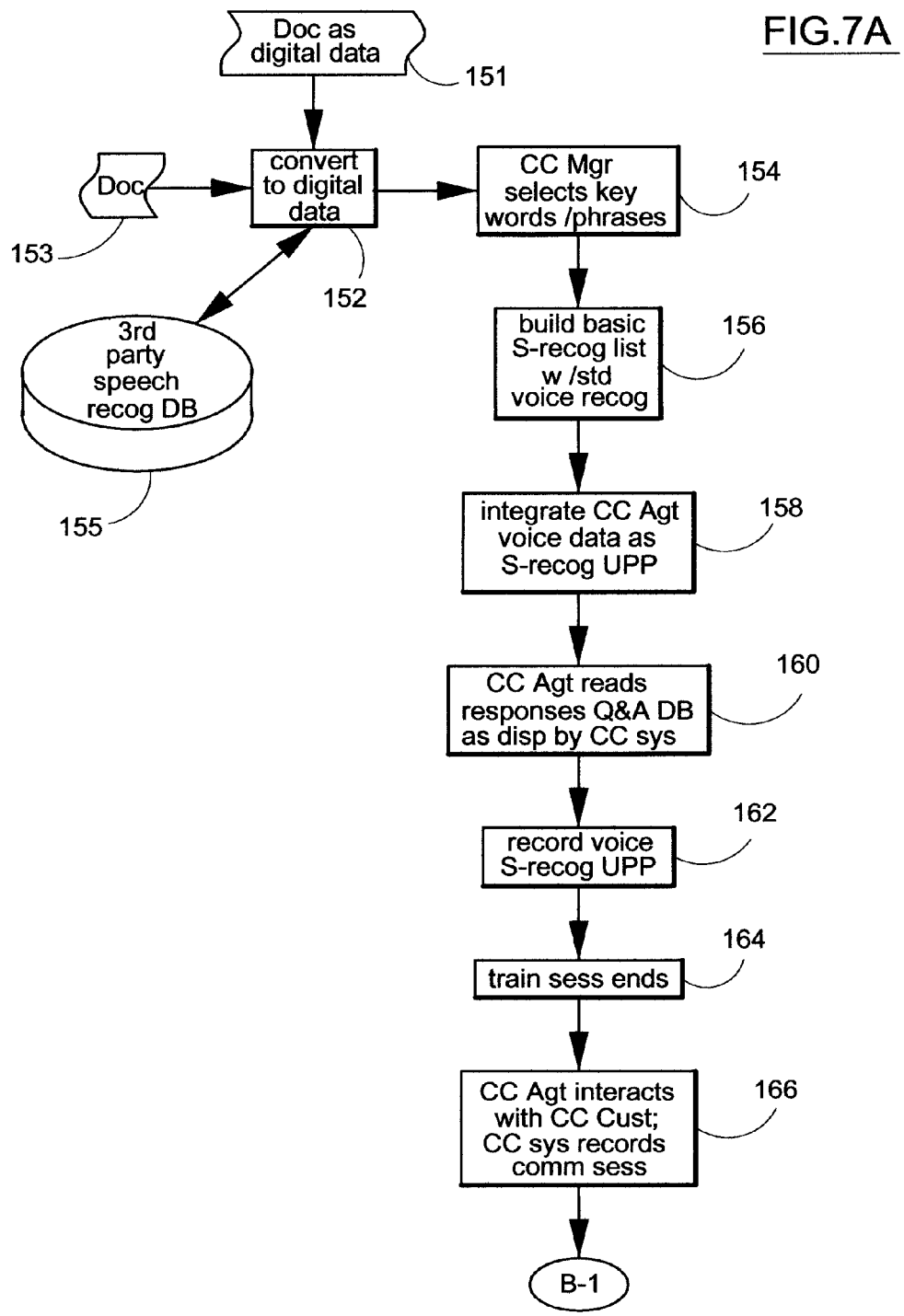
FIGS. 7A and 7B diagrammatically illustrate the initial set-up and the operation of the integration of the agent keyword and phrase database into the basic database Q&A database.
Figure 7B:
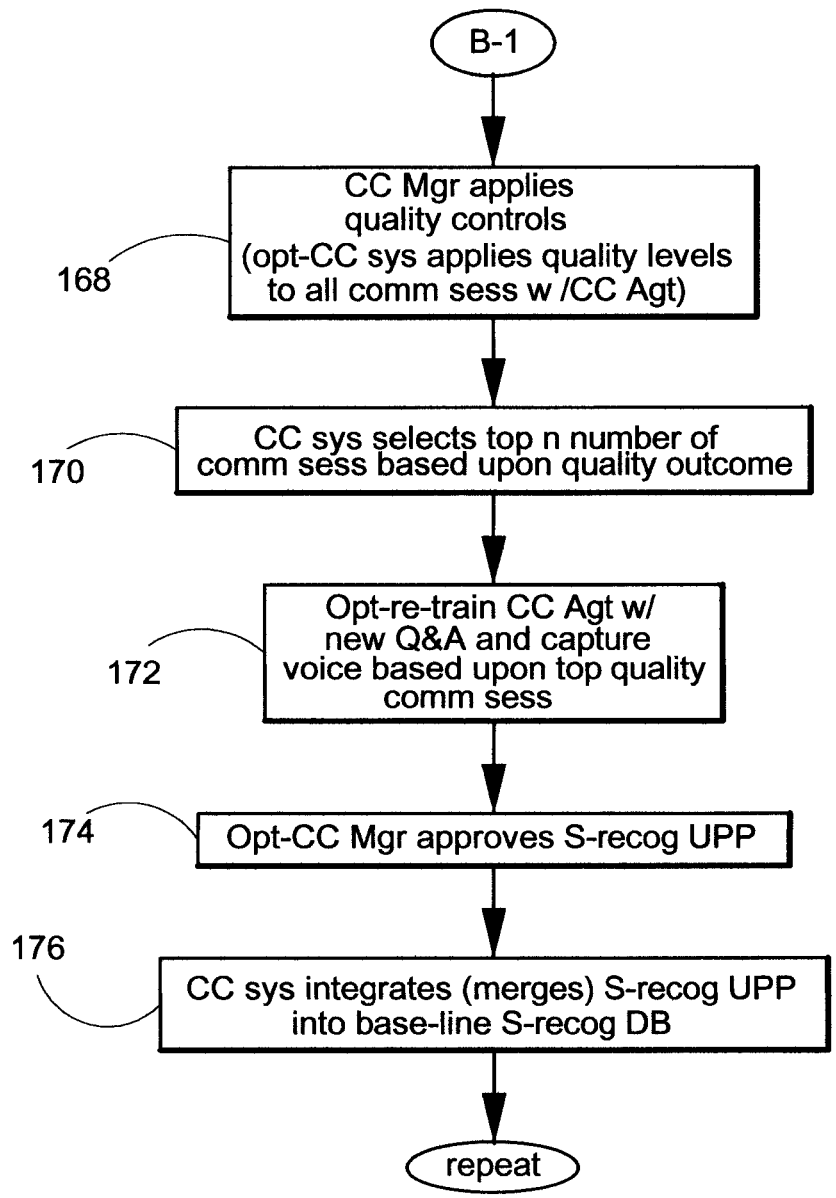

FIGS. 7A and 7B show a slightly different compilation, process method and system modules for the present invention. In step 152, the system converts to digital data one or two types of input data. One type of input is a document 153 which could be a computerized document or a document that is read by a call center manager with an IVR module (discussed earlier). In input block 151, the input document is already in digital form. Therefore, data conversion input 151 in digital conversion step 152 is less burdensome. If the manager reads the document 153, the system utilizes a third party speech recognition database 155. By renting or leasing the third party speech recog DB, this greatly lowers the set-up cost for the call center program.

In step 154, the manager selects keywords and phrases. This may be automated based upon the frequency of the keywords or the import or definition of the keywords. In step 156, the system builds the basic speech recognition list with standard voice recognition decoder and basic recognition data. Therefore, the manager may use a textual presentation for the input data in 156 which is displayed to the manager. The building of the speech recognition list for the Q&A database in step 156 could utilized the display to the manager and a capture of the manager's response to the Q&A couplet. This effectively is the initial speech data for the call center. This initial speech data is captured by the manager reading document 153 which is decoded by the speech decoder discussed above. The Q&A database with the basic keywords and phrases is then compiled (step 156).

In step 158, the system integrates the agent voice data as the agent keyword and phrase database by input from the agent. In step 160, the agent reads responses in the Q&A database as displayed by the call center system. In step 162, the system records this Q&A event with the agent and registers key speech elements in the agent keyword database, generally identified as S-Recog UPP in the present illustration. In step 164, the training session with the agent ends.

In step 166, the agent interacts with the call center customer. The call center monitors this telecommunications event and communications event and records the event. the comm session recorder is ON. The system jumps in jump point B1 to the next figure.

In FIG. 7B, the manager applies quality control in step 168. Optionally the system would apply programmed quality controls to all the communication sessions. This quality control may include determining whether the communications event was a non specific event, a sales event or a customer satisfaction event. Since the system monitors a large number of communications events, the system sums or accumulates the number of successful events. A summer module is used.

Generally the successful events are identified herein as sales events or customer satisfaction events. Other terms may be applied for these successful comm sessions, hence the term "customer satisfaction event" covers other names and terms which signal a beneficial comm sessions outcome. When these successful events (sales and customer satisfaction) exceed a certain predetermined value, a top quality score (a data marked like Q+) is assigned to that particular agent keyword and phrase data. The associate or underlying questions and answers for Q+ scores are then selected from the Q&A database. Further, the agent speech data from the agent keyword database is used to select the Q+Q&A couplet. The system integrates the agent key speech data into the basic Q&A database when enough Q+ scores are noted by the system. This is a positive feedback loop.

Therefore returning to FIG. 7B, in step 170, the system selects the top n number of communications sessions based upon quality outcome Q+ characteristics. In step 172, the system retrains the agent with new question and answer responses and captures the agent's voice based upon top quality communications sessions. In step 174, optionally the manager approves the agent key speech data. In step 176, the system integrates or merges the selected agent key speech data, selected based upon the successful outcome or high quality Q+ of a number of communications sessions, and integrates those top Q+ selected agent key speech data into the basic Q&A speech recognition database.

FIG. 8 diagrammatically shows a positive feedback loop which is one of the several important features of the present invention. In step 180, the agent stores key terms and voice data into his or her own agent keyword database. In step 182, communications sessions are monitored and recorded for a large number n of communications events between the agent and customers. In step 184, the system selects m top quality Q+ communication sessions. In step 186, the system either integrates, merges or migrates the Q+ agent keyword data at UPP1 into the Q&A basic speech recognition database. The Q&A database is enhanced to the first level with high Q+ agent keywords/phrases. The integration is identified as integrate p in FIG. 8. The speech recognition Q&A database 187 is shown as a singular data structure in FIG. 8 with UPP1 and UPP 2 which are the agent keyword and key phrase database segment for agent 1 and agent 2.

The system has a positive feedback system because high Q+ scores generally continually update the basic Q&A speech recognition database. Prior to the Q+ integration, when the agent and the customer engage in communication sessions, the system sums, at sum point 189, both the basic keyword and key phrase from the speech recognition database as well as the speaking agent's keyword and key phrase database UPP 1. After the integration p step 186, the system in step 188 selects r number of quality Q− communication sessions which are the least successful or bottom quality communication sessions. In decision step 190, the system determines whether the Q− quality communication sessions, that is r number of Q- sessions exceed an error limit. If NO, the system cycles to jump point C1 and step 182.

If YES, the system executes step 192 wherein the manager is notified, the agent is retrained and the agent keyword and key phrase database UPP is reset. In step 194, the integration function p is reversed for the Q- communication sessions which removes the Q- agent keywords/phrases from the revised Q&A database, thereby returning the system form memory state 126 (FIG. 6, S-Recog Ver2) to memory state 22 (S-Recog Std). This error Q- removal cycle is a negative feedback control loop. The system then cycles back to jump point C1 and step 182.

In the drawings, and sometimes in the specification, reference is made to certain abbreviations. The following Abbreviations Table provides a correspondence between the abbreviations and the item or feature.

Abbreviations Table

| | |
|---|---|
| ad | advertisement |
| Admin | Administrator |
| addr | address - typically an IP address |
| alt. | alternate or optional path or step |
| API | application program interface |
| appln. | application, typically made by customer |
| A-sp | customer A speech, represented by digital signals, typically accepted by the CC comp. |
| ASP | application service provider - server on a network |
| bd | board |
| Bus. | Business |
| CC | Call Center, usually, Call Center computer system |
| CC Oper. | System Operator of the Call Center |
| CC agt | Agent at the Call Center (note: Agent may be remotely coupled, via telecomm network, to the Call Center |
| CC cust | Call Center customer or the person calling the Call Center for some request or the Call Center calling the person for some reason |
| CC Sys | Call Center System |
| CD-RW | compact disk drive with read/write feature for CD disk |
| chrg | credit card or debit card charge |
| comm. | communications, typically telecommunications (telecomm) |
| comm sess | communications session |
| comp | computer having internet enabled communications module |
| Cos. | companies |
| CPU | central processing unit |
| cr.cd. | credit card |
| cust | Customer |
| DB | data base |
| disp | display, typically display a web page or display certain information |
| doc | document |
| drv | drive, e.g., computer hard drive |
| DS | data storage |
| e | encryption |
| e.g. | for example |
| em | email |
| Emo | emotional module that senses voice signals and outputs an indication of the emotional state of the speaker, that is, the CC customer or the CC agent |
| equip | equipment |
| esp. | especially, or primarily an example |
| Fac | Facility, as in CC Facility |
| Go | geographic location or code (Gaelic. is G.P.S. data) |
| G.P.S. | Go positioning system and location (optionally time data) |
| h-link | hyper link to a certain webpage or landing page |
| I/O | input/output |
| id | identify |
| idx | index |
| ie or IE | Internet-enabled device, like a smart phone, tablet computer, computer, etc. |
| IP addr. | internet protocol address of internet enabled device |
| IVR | interactive voice response |
| loc | location |
| mem | memory |
| mess | message as in SMS or text message |
| mkting | marketing |
| mbr | member |

Abbreviations Table -continued

| | |
|---|---|
| ntwk | network, namely a telecomm network, typically internet based network. A local area network is also possible. |
| obj | object, for example, a data object |
| opt | optional or alternative program or module |
| pg. | page, typically a web page, may be a landing web page |
| pgm | program |
| ph | phone, namely an internet enabled phone, such as a smart phone |
| ph.no. | phone number |
| pt. | point, as in jump point to another portion of the program |
| Pty | party engaged in telecomm or internet enabled communications |
| P/W | password |
| Q & A | question and answer, typically the CC customer asks a question, CC Sys decodes speech and displays various responses for th CC Agent, form the Q & A DB |
| Qual | Quality review |
| rcd | record or log-in data; sometimes also refers to a database record |
| re | regarding or relating to |
| recog | recognition, such as speech recognition |
| Reg'd | registered |
| rel | release |
| rem | reminder, such as a reminder email to the CC Agt |
| RQT | request |
| resp | response |
| rvw | review |
| rpt | Report |
| rt | real time, may include day and time stamp data |
| sch | search |
| sec | security |
| sel | select |
| smart ph | smart phone coupled to the internet |
| SR | sales representative |
| S-recog | speech recognition or decoding digital voice signals form a CC customer of a CC agent |
| sms | text message |
| stmt | statement, as in documented statement |
| std | standard' 3 |
| Svr | sever, as in web server |
| sys | system |
| Sys Op | System Operator, esp., Call Center Operator |
| t | time |
| telecom | telecommunications system or network |
| tbl | tablet computer |
| TTP | Trusted Third Party system |
| UPP | user's personal profile, for example a CC Agent completes a UPP prior to inputting his or her voice data |
| URL | Uniform Resource Locator, x pointer, or other network locator |
| univ. | universal application or common application |
| w/ | with |
| w/in | within |
| w/out | without |
| wrt | with respect to |

Description of Typical System Features

The present invention relates to a system and method for operating an intelligent call center which processes voice data and decodes the same which, in turn, triggers proposed answers to questions raised by customers who call the call center. Data is captured via the telecommunications network by computer systems, over the Internet and/or on a computer network (LAN or WAN), and by computer programs, computer modules and information processing systems which accomplish the speech recognition and positive feedback loops to improve the call center operations vis-a-vis the customer.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The claims appended hereto are meant to cover modifications and changes within the scope and spirit of the present invention.

What is claimed is:

1. A computerized method for decoding speech exchanged between an agent operating through a call center and a customer over a telecommunications network during a responsive agent-customer communicative event, the agent and customer speech represented by digital voice data passing over said telecommunications network through a computer system at said call center, the method comprising:
    establishing, prior to said communicative event, a basic Q&A question and responsive answer database with a plurality of question and answer records therein, said basic Q&A database having a plurality of basic key words therein and a plurality of basic key word phrases therein which words and phrases are found within said plurality of question and answer records, each question and answer having associated therewith a unique combination of one or more basic key words or phrases such that each said unique combination corresponds to a single question and answer, each respective basic key word and phrase further associated with corresponding speech recognition data;
    providing said call center with a speech decoder communicatively coupled to said call center computer, said basic Q&A database and said telecommunications network;
    effecting the display to said agent of an initial training set of either (a) an initial plurality of questions and responsive answers or (b) an initial plurality of basic key words and phrases for corresponding questions and responsive answers;
    capturing and storing, in an agent's key word and phrase database, the agent's response to the displayed initial training set as agent key speech data;
    associating said agent key speech data with said basic key words and phrases and corresponding questions and answers in said basic Q&A database;
    during the communicative event between said agent and said customer, decoding real time agent speech by recognizing a match between the real time speech data and either (a) said speech recognition data corresponding to said basic key words and phrases in said Q&A database or (b) said agent key word and phrase database;
    wherein both said basic key words and phrases and said agent key speech data is associated with corresponding questions and answers in said basic Q&A database; and
    effecting a real time display of the associated corresponding questions and answers from the Q&A database for the real time agent speech;
    wherein the communicative event results in either a non-specific event or a sales event or a customer satisfaction event based upon the customer's conclusory acts, the method including:
    monitoring a plurality of agent-customer communicative events and summing the number of sales events and customer satisfaction events from the monitored agent-customer communicative events;
    determining when the sum exceeds a predetermined value; and
    selecting questions and answers from the Q&A database which correspond to said sales events and customer satisfaction events;
    further selecting said agent key speech data associated with the selected questions and answers; and
    integrating the further agent key speech data into said basic Q&A database as part of said speech recognition data corresponding to said selected questions and answers.

2. The computerized method for decoding speech as claimed in claim 1 wherein a call center manager engages in a communicative training session with said call center over said telecommunications network;
    wherein establishing the basic Q&A database includes:
    effecting the display to said manager of a textual presentation of a plurality of questions and responsive answers;

capturing the manager's response to the displayed text representing the plurality of questions and responsive answers as initial speech data;

decoding said initial speech data by utilizing a speech recognition database, the decoded speech represented by digital words;

creating said Q&A database with said basic key words and phrases with the decoded speech.

3. The computerized method for decoding speech as claimed in claim 1 wherein the association of agent key speech data with said basic key words and phrases utilizing said speech decoder to recognize a match between the captured agent's response and said basic key words and phrases.

4. A non-transitory computer readable medium containing programming instructions for decoding speech exchanged between an agent operating through a call center and a customer over a telecommunications network during a responsive agent-customer communicative event, the agent and customer speech represented by digital voice data passing over said telecommunications network through a computer system at said call center, the method comprising:

establishing, prior to said communicative event, a basic Q&A question and responsive answer database having a plurality of question and answer records therein, said basic Q&A database having a plurality of basic key words therein and a plurality of basic key word phrases therein which words and phrases are found within said plurality of question and answer records, each question and answer having associated therewith a unique combination of one or more basic key words or phrases such that each said unique combination corresponds to a single question and answer, each respective basic key word and phrase further associated with corresponding speech recognition data;

providing said call center with a speech decoder communicatively coupled to said call center computer, said basic Q&A database and said telecommunications network;

effecting the display to said agent of an initial training set of either (a) an initial plurality of questions and responsive answers or (b) an initial plurality of basic key words and phrases for corresponding questions and responsive answers;

capturing and storing, in an agent's key word and phrase database, the agent's response to the displayed initial training set as agent key speech data;

associating said agent key speech data with said basic key words and phrases and corresponding questions and answers in said basic Q&A database;

during the communicative event between said agent and said customer, decoding real time agent speech by recognizing a match between the real time speech data and either (a) said speech recognition data corresponding to said basic key words and phrases in said Q&A database or (b) said agent key word and phrase database;

wherein both said basic key words and phrases and said agent key speech data is associated with corresponding questions and answers in said basic Q&A database; and effecting a real time display of the associated corresponding questions and answers from the Q&A database for the real time agent speech;

wherein the communicative event results in either a non-specific event or a sales event or a customer satisfaction event based upon the customer's conclusory acts, the method including:

monitoring a plurality of agent-customer communicative events and summing the number of sales events and customer satisfaction events from the monitored agent-customer communicative events;

determining when the sum exceeds a predetermined value; and selecting questions and answers from the Q&A database which correspond to said sales events and customer satisfaction events;

further selecting said agent key speech data associated with the selected questions and answers; and integrating the further agent key speech data into said basic Q&A database as part of said speech recognition data corresponding to said selected questions and answers.

5. A non-transitory computer readable medium containing programming instructions for decoding speech as claimed in claim 4 wherein a call center manager engages in a communicative training session with said call center over said telecommunications network;

wherein establishing the basic Q&A database includes:

effecting the display to said manager of a textual presentation of a plurality of questions and responsive answers;

capturing the manager's response to the displayed text representing the plurality of questions and responsive answers as initial speech data;

decoding said initial speech data by utilizing a speech recognition database, the decoded speech represented by digital words;

creating said Q&A database with said basic key words and phrases with the decoded speech.

6. A non-transitory computer readable medium containing programming instructions for decoding speech as claimed in claim 4 wherein the association of agent key speech data with said basic key words and phrases utilizing said speech decoder to recognize a match between the captured agent's response and said basic key words and phrases.

7. A computerized speech decoding system for decoding speech exchanged between an agent operating through a call center and a customer over a telecommunications network during a responsive agent-customer communicative event, the agent and customer speech represented by digital voice data passing over said telecommunications network through a computer system at said call center, comprising:

the call center computer having a speech decoder operatively coupled to a data processor and a memory store, said speech decoder communicatively coupled to said telecommunications network, said memory store having a basic question and responsive answer Q&A database and an agent's key word and phrase database, said basic Q&A database and an agent's key word and phrase database being either separate linked databases or an integrated database;

said basic Q&A database having a plurality of question and answer records therein with a plurality of basic key words and a plurality of basic key word phrases which words and phrases are found within said plurality of question and answer records, each question and answer Q&A couplet having associated therewith a unique combination of one or more basic key words or phrases such that each said unique combination corresponds to a single Q&A couplet, said basic Q&A database having speech recognition data corresponding to each respective basic key word and phrase;

means for effecting the display to said agent of an initial training set of either (a) an initial plurality of questions and responsive answers or (b) an initial plurality of basic key words and phrases for corresponding questions and responsive answers, said means for effecting the display to said agent coupled to said data processor and said memory store;

a recorder, coupled to said telecommunications network, capturing an agent's response to the displayed initial training set as agent key speech data;

means for storing said agent key speech data in said agent's key word and phrase database, said agent key speech data associated with initial plurality of questions and responsive answers either by the inclusive basic key words and phrases or the initial plurality of basic key words and phrases which correspond to certain questions and responsive answers;

a session recorder for said responsive agent-customer communicative event, said session recorder coupled to said telecommunications network and recording the communicative event between said agent and said customer;

said speech decoder, coupled to said session recorder, decoding real time agent speech during the communicative event by recognizing a match between the real time agent speech data and either (a) said speech recognition data corresponding to said basic key words and phrases in said Q&A database or (b) said agent key word and phrase database, both said basic key words and phrases and said agent key speech data being associated with corresponding questions and answers in said basic Q&A database;

means for retrieving from the Q&A database the associated corresponding questions and answers for the real time agent speech; and said means for effecting the display to the agent, effecting a real time display of the retrieved questions and answers;

wherein the communicative event between the agent and the customer results in either a non-specific event or a sales event or a customer satisfaction event based upon the customer's conclusory acts, the system including:

a communications event monitor, coupled to said session recorder, for monitoring a plurality of agent-customer communicative events;

means for determining, coupled to said monitor, whether the agent-customer communicative event results in said sales event or said customer satisfaction event by basic key word and phrase matching utilizing said speech decoder;

further means for determining whether a number of said sales events and said customer satisfaction events from the monitored agent-customer communicative events exceeds a predetermined value and generating an integration command; and means for selecting questions and answers from the Q&A database which correspond to said sales events and customer satisfaction events and for further selecting said agent key speech data associated with the selected questions and answers; and means for integrating the further agent key speech data into said basic Q&A database as part of said speech recognition data corresponding to said selected questions and answers based upon said integration command.

8. An agent-centric computerized speech decoding system for decoding speech exchanged between an agent operating through a call center and a customer over a telecommunications network during a responsive agent-customer communicative event, the agent and customer speech represented by digital voice data passing over said telecommunications network through a computer system at said call center, the call center computer having a speech decoder operatively coupled to a data processor and a memory store, said speech decoder communicatively coupled to said telecommunications network, said memory store having a basic question and responsive answer Q&A database and an agent's key word and phrase database, said basic Q&A database and an agent's key word and phrase database being either separate linked databases or an integrated database, said basic Q&A database having a plurality of question and answer records therein with a plurality of basic key words and a plurality of basic key word phrases which words and phrases are found within said plurality of question and answer records, each question and answer Q&A couplet having associated therewith a unique combination of one or more basic key words or phrases such that each said unique combination corresponds to a single Q&A couplet, said basic Q&A database having speech recognition data corresponding to each respective basic key word and phrase, the agent-centric computerized speech decoding system comprising:

means for effecting the display to said agent of an initial training set of either (a) an initial plurality of questions and responsive answers or (b) an initial plurality of basic key words and phrases for corresponding questions and responsive answers, said means for effecting the display to said agent coupled to said data processor and said memory store;

a recorder, coupled to said telecommunications network, capturing an agent's response to the displayed initial training set as agent key speech data;

means for storing said agent key speech data in said agent's key word and phrase database, said agent key speech data associated with initial plurality of questions and responsive answers either by the inclusive basic key words and phrases or the initial plurality of basic key words and phrases which correspond to certain questions and responsive answers;

a session recorder for said responsive agent-customer communicative event, said session recorder coupled to said telecommunications network and recording the communicative event between said agent and said customer;

said speech decoder, coupled to said session recorder, decoding real time agent speech during the communicative event by recognizing a match between the real time agent speech data and either (a) said speech recognition data corresponding to said basic key words and phrases in said Q&A database or (b) said agent key word and phrase database, both said basic key words and phrases and said agent key speech data being associated with corresponding questions and answers in said basic Q&A database;

means for retrieving from the Q&A database the associated corresponding questions and answers for the real time agent speech; and said means for effecting the display to the agent, effecting a real time display of the retrieved questions and answers;

wherein the communicative event between the agent and the customer results in either a non-specific event or a sales event or a customer satisfaction event based upon the customer's conclusory acts, the system including:

a communications event monitor, coupled to said session recorder, for monitoring a plurality of agent-customer communicative events;

means for determining, coupled to said monitor, whether the agent-customer communicative event results in said sales event or said customer satisfaction event by basic key word and phrase matching utilizing said speech decoder;

further means for determining whether a number of said sales events and said customer satisfaction events from the monitored agent-customer communicative events exceeds a predetermined value and generating an integration command; and means for selecting questions and answers from the Q&A database which correspond to said sales events and customer satisfaction events and for further selecting said agent key speech data associated with the selected questions and answers; and means for integrating the further agent key speech data into said basic Q&A database as part of said speech recognition data corresponding to said selected questions and answers based upon said integration command.

\* \* \* \* \*